US011585283B2

(12) United States Patent
Steinert

(10) Patent No.: US 11,585,283 B2
(45) Date of Patent: Feb. 21, 2023

(54) GAS GENERATOR SPEED LIMIT AND POWER RECOVERY

(71) Applicant: Bell Textron Inc., Fort Worth, TX (US)

(72) Inventor: Alan Hisashi Steinert, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 57 days.

(21) Appl. No.: 17/094,340

(22) Filed: Nov. 10, 2020

(65) Prior Publication Data

US 2022/0145810 A1    May 12, 2022

(51) Int. Cl.

| F02C 9/42 | (2006.01) |
|---|---|
| B64C 27/06 | (2006.01) |
| B64C 27/12 | (2006.01) |
| B64C 27/82 | (2006.01) |
| B64D 27/10 | (2006.01) |
| B64D 27/24 | (2006.01) |
| B64D 31/04 | (2006.01) |
| B64D 37/00 | (2006.01) |
| B64D 41/00 | (2006.01) |
| F02C 6/20 | (2006.01) |
| B64D 27/02 | (2006.01) |

(52) U.S. Cl.
CPC ............... *F02C 9/42* (2013.01); *B64C 27/06* (2013.01); *B64C 27/12* (2013.01); *B64C 27/82* (2013.01); *B64D 27/10* (2013.01); *B64D 27/24* (2013.01); *B64D 31/04* (2013.01); *B64D 37/00* (2013.01); *B64D 41/00* (2013.01); *F02C 6/20* (2013.01); *B64C 2027/8209* (2013.01); *B64D 2027/026* (2013.01); *F05D 2220/323* (2013.01); *F05D 2220/76* (2013.01); *F05D 2270/053* (2013.01)

(58) Field of Classification Search
CPC ......... B64C 27/06; B64C 27/12; B64C 27/82; B64C 2027/8209; B64D 27/10; B64D 27/24; B64D 31/04; B64D 37/00; B64D 41/00; B64D 2027/026; F02C 6/20; F02C 9/42; F05D 2220/76; F05D 2270/053
See application file for complete search history.

(56) References Cited

U.S. PATENT DOCUMENTS

| 4,813,226 A * | 3/1989 | Grosselfinger | ........... F02C 9/54 60/39.27 |
|---|---|---|---|
| 7,513,120 B2 * | 4/2009 | Kupratis | ................. F02C 3/113 60/788 |
| 9,404,425 B2 * | 8/2016 | Martin | ...................... F02C 9/00 |
| 2006/0225431 A1 | 10/2006 | Kupratis | |
| 2011/0185698 A1 | 8/2011 | Morgan et al. | |

(Continued)

FOREIGN PATENT DOCUMENTS

EP          3733509 A1    11/2020

*Primary Examiner* — Jason H Duger
(74) *Attorney, Agent, or Firm* — Shackelford, Bowen, McKinley & Norton, LLP

(57) ABSTRACT

An exemplary aircraft includes a turbine engine having a gas generator spool and a power spool, the power spool operational to drive a rotor, a first generator coupled to the gas generator spool, and a controller operable to increase a load on the gas generator spool when the gas generator spool is on a speed limit thereby increasing a speed limit margin in order to increase power available from the turbine engine.

15 Claims, 3 Drawing Sheets

(56) References Cited

U.S. PATENT DOCUMENTS

| | | |
|---|---|---|
| 2013/0247539 A1 | 9/2013 | Hoppe |
| 2014/0360205 A1 | 12/2014 | French et al. |
| 2015/0191252 A1* | 7/2015 | Cline ........................ F02C 6/14 |
| | | 60/39.24 |
| 2016/0069277 A1 | 3/2016 | Meisner et al. |
| 2016/0252019 A1* | 9/2016 | Joshi ......................... F02C 9/20 |
| | | 60/776 |
| 2017/0058781 A1 | 3/2017 | Waltner et al. |
| 2017/0349274 A1* | 12/2017 | Fenny ..................... B64C 27/82 |
| 2018/0025557 A1 | 1/2018 | Steinert |
| 2019/0244443 A1 | 8/2019 | Steinert |
| 2020/0047911 A1 | 2/2020 | Parsons |

\* cited by examiner

GAS GENERATOR SPEED LIMIT AND POWER RECOVERY

TECHNICAL FIELD

This disclosure relates in general to the field of aircraft, and more particularly, but not by way of limitation, to flight controls and maximizing turbine engine power.

BACKGROUND

This section provides background information to facilitate a better understanding of the various aspects of the disclosure. It should be understood that the statements in this section of this document are to be read in this light, and not as admissions of prior art.

In gas turbine engines, the rotational speed of the high-speed or gas generator spool varies in a fixed relationship with the turbine engine power. When an engine is limited by gas generator speed the engine power is also limited.

SUMMARY

An exemplary aircraft includes a turbine engine having a gas generator spool and a power spool, the power spool operational to drive a rotor, a first generator coupled to the gas generator spool, and a controller operable to increase a load on the gas generator spool when the gas generator spool is on a speed limit thereby increasing a speed limit margin in order to increase power available from the turbine engine.

An exemplary turbine engine power recovery method includes boosting turbine engine power in an aircraft, the turbine engine comprising a high-speed spool and a low-speed spool, increasing a load on the high-speed spool thereby increasing a speed limit margin of the turbine engine, and adding fuel to the high-speed spool thereby increasing the turbine engine power.

Another exemplary turbine engine power recovery method includes detecting that a turbine engine is operating at a gas generator speed limit, receiving a demand for additional turbine engine power while at the gas generator speed limit, increasing, responsive to the demand for additional power, a load on the gas generator spool thereby reducing the gas generator speed (NG) from the gas generator speed limit, and adding, responsive to the demand for additional power, additional fuel to the gas generator spool thereby increasing the speed of the gas generator spool and producing additional power.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
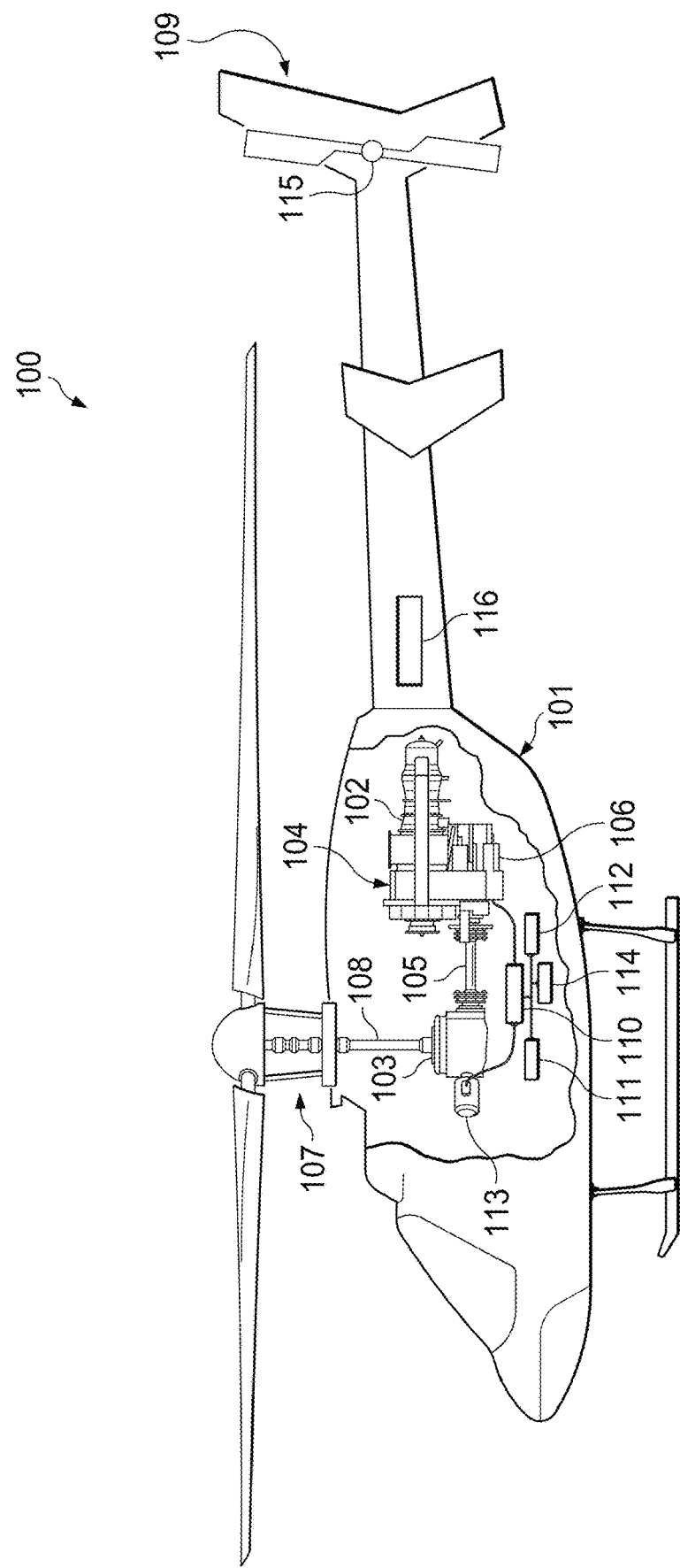
FIG. 1 schematically illustrates an exemplary aircraft incorporating a power recovery system according to aspects of the disclosure.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

FIG. 1 illustrates an exemplary vehicle 100 implementing a turbine engine power recovery system and method. Exemplary vehicle 100 is illustrated as an aircraft, in particular a helicopter, for the purpose of description. The turbine power recovery system is applicable to any vehicle that utilizes a multiple-spool gas turbine that may be limited by mechanical or corrected high-speed spool limits. In an exemplary embodiment, vehicle 100 is an aircraft including any fixed-wing, rotorcraft, tiltrotor, vertical takeoff and landing, commercial, military, or civilian aircraft having a multiple-spool gas turbine engine.

In FIG. 1, vehicle 100 is an aircraft having a fuselage 101, an engine 102, a main rotor gearbox 103 mechanically coupled to engine 102 through an accessory gearbox 104. Exemplary aircraft is a helicopter. Accessory gearbox 104 has a driveshaft 105 powering main rotor gearbox 103 and may include a rear driveshaft powering tail rotor 109. Tail rotor 109, e.g., anti-torque rotor, may be driven by an electric motor. Accessory gearbox 104 has attachment points for the engine accessories, such as starter-generator 106, a fuel pump, tachometers, etc. Rotor 107 is mechanically coupled to main rotor gearbox 103 by mast 108.

Starter-generator 106 may be used to start engine 102. Once started, engine 102 causes electrical power generation through starter-generator 106 to provide electrical power to vehicle 100 via power distribution controller 110, essential bus 111, non-essential bus 112, and other busses or lines, such as a hybrid bus 114. Essential bus 111 may provide electrical power to flight instruments, cockpit lighting, navigation equipment, communication equipment, and other essential flight or safety systems. Non-essential bus 112 may provide electrical power to high-load equipment, such as an air conditioning system, passenger lighting, radar system, galley equipment, or the like. Hybrid bus 114 may provide electrical power to one or more electric motors 115 to drive a fan such as tail rotor 109 and to electric storage 116 (e.g., battery, capacitor). Starter-generator 106 is driven by accessory gearbox 104 and generates sufficient electrical power capacity to serve electrical loads for vehicle 100. In some embodiments, a generator 113 may be installed on the aircraft transmission or main rotor gearbox 103. The electric busses may selectively draw electrical loads from generators 106 and 113, thereby selectively loading the high-speed and power spools of engine 102.

In some cases, it can be desirable to provide a control system for an aircraft power plant that detects power demand, for example through pilot input, and increases the load on the high-speed spool, when engine 102 is on a gas generator speed (NG) limit, for example a mechanical or a corrected gas generator speed (NGc) limit, to increase the speed limit margin and the available engine 102 power. Control logic may monitor and calculate parameters and conditions such as the engine power demand, electrical load from starter-generator 106 and generator 113, measured gas temperature (MGT), outside air temperature (OAT), speed margin available to a mechanical speed limited and/or to a corrected gas generator speed limit, and temperature margin available. When maximum power is requested, the control logic may increase load on the high-speed spool (N1) to increase engine power available to vehicle 100, thereby increasing overall performance. The increased load on the high-speed spool may be achieved by increasing the electrical load for example on generator 106. The increased electrical load may be wasted, communicated to electrical power storage, or propulsion. In an example, electrical load on generator 113 driven by the power spool may be transferred to starter-generator 106 to increase the electrical load on starter-generator 106 and thereby increase the load on the high-speed spool.

The main power and accessory drive gear trains are enclosed in accessory gearbox 104. Gearbox 104 is connected to engine 102 and all engine components, including the high-speed or gas generator spool and the power spool, and engine accessories are attached to gearbox 104 case. In one embodiment, a two-stage helical and spur gear set is used to reduce rotational speed at the power spool or turbine (N2) drive (approximately 33,000 RPM for example) to the output drive spline (approximately 6,000 RPM). A tachometer-generator and power turbine speed governor are mounted externally to gearbox 104 and are driven by the N2 gear train. The fuel pump, gas producer tachometer-generator, gas producer fuel control, and starter-generator 106 accessories are mounted externally to gearbox 104 and are driven by the gas generator turbine or spool (N1 or Ng) (at approximately 51,000 RPM). The N2 gear train and turbine are not mechanically tied to the NG gear assembly. The N2 turbine is turned by the energy of the expanding hot gas delivered to it by the Ng gear train. The purpose of the N2 gear train is to convert the kinetic energy produced by the motion of the N2 rotor to usable shaft horsepower to sustain aircraft flight. The compressor is directly driven by the gas generator turbine (Ng). The power turbine (N2) drives the engine power-takeoff gear shaft through a reduction gear train. When engine 102 is powering rotor 107, the N2 RPM and hence rotor RPM, is kept constant by the action of an N2 governor. The N2 governor will cause a fuel control unit to alter fuel flow to vary the Ng RPM to suit changing power (torque) requirements.

Figure 2:
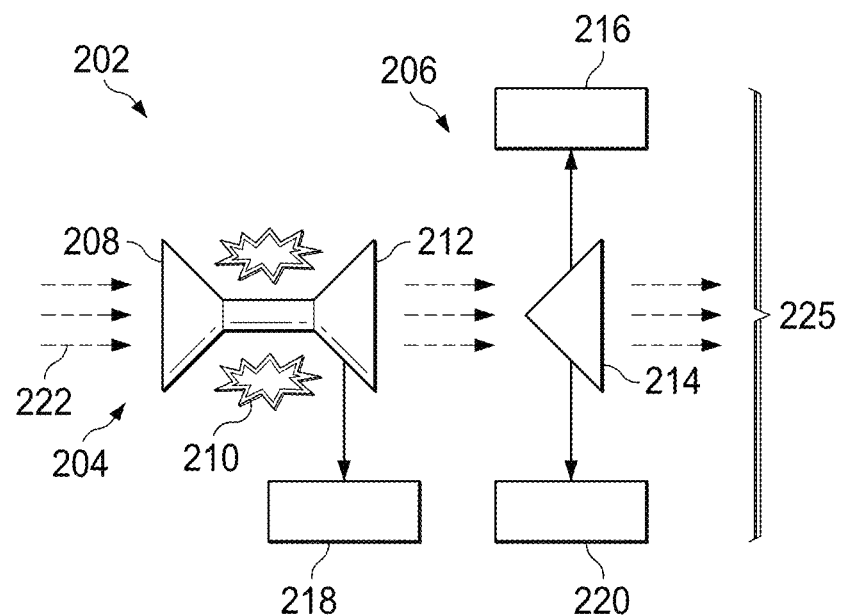
FIG. 2 schematically illustrates an exemplary multiple spool turbine engine incorporating a power recovery system according to aspects of the disclosure.

FIG. 2 schematically illustrates an exemplary multiple spool turbine engine 202 incorporating a power recovery system 225 according to aspects of this disclosure. Turbine engine 202 includes a high pressure or gas generator spool 204 (N1) and a low-speed or power spool 206 (N2). Gas generator spool 204 includes a gas generator 208, a combustor 210, and a gas generator turbine 212. Power spool 206 includes a power turbine 214. Power spool 206 and power turbine 214 are connected to a fan or rotor 216 of an aircraft. A first generator 218 is coupled to the gas generator spool 204 and a second generator 220 may is coupled to power spool 206. Power recovery system 225 monitors power demand and engine conditions or parameters such as engine limits, limit margins, and outside ambient conditions. During flight, the gas generator commonly spins faster than the power turbine. When the gas generator spool is at a gas generator speed limit (mechanical or corrected) and not at a temperature limit, engine power is available if the gas generator spool speed is reduced. Power recovery system 225 monitors engine conditions and upon receiving a demand for additional power can automatically increase the load on the gas generator spool thereby increasing the power that is available from the engine. The additional load on the gas generator spool slows the gas generator spool speed, increasing the speed margin available, and allowing for additional fuel 222 to be injected to the gas generator so that the turbine engine generates more power.

Figure 3:
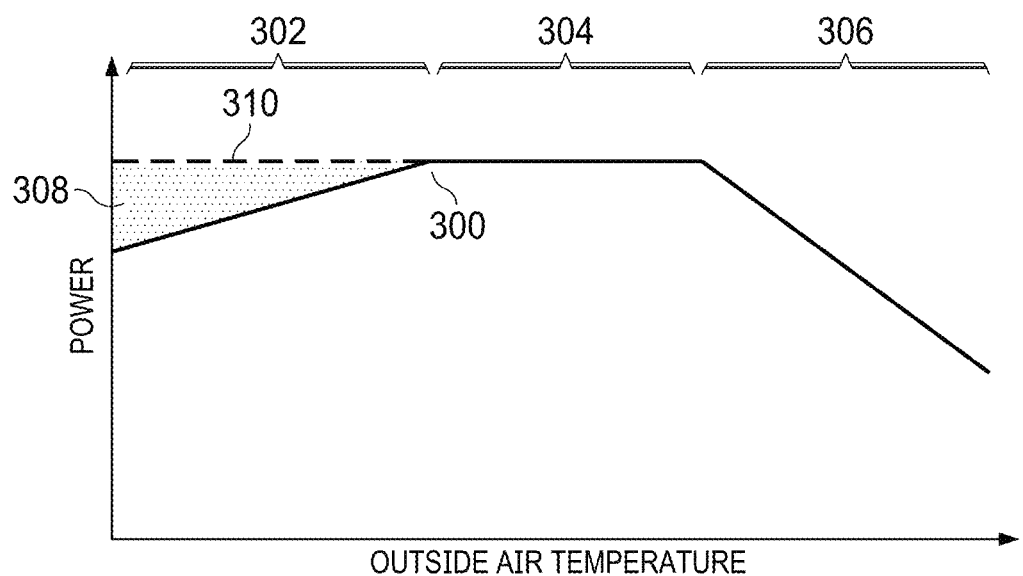
FIG. 3 illustrates an exemplary engine power available graph illustrating a power recovery according to aspects of the disclosure.

FIG. 3 illustrates an engine power available graph 300 for a helicopter where the X-axis represents changes in outside air temperature (OAT) and the Y-axis represents power available. Graph 300 includes three power limit sections. Section 302 is a corrected gas generator speed (NGc) limited region, section 304 is a mechanical limit of the engine, e.g., torque limit, and section 306 is a measured gas temperature (MGT) limit. At low outside temperature engine power is limited by the corrected gas generator speed as the gas generator spool spins faster than the power spool. The power recovery system is directed to recovering or making available the engine power typically not available in NGc limited section 302, i.e., the power illustrated by the shaded region 308 between section 302 of graph 300 and the dashed line 310 approximately equal to the power available at the mechanical limited section 304.

Figure 4:
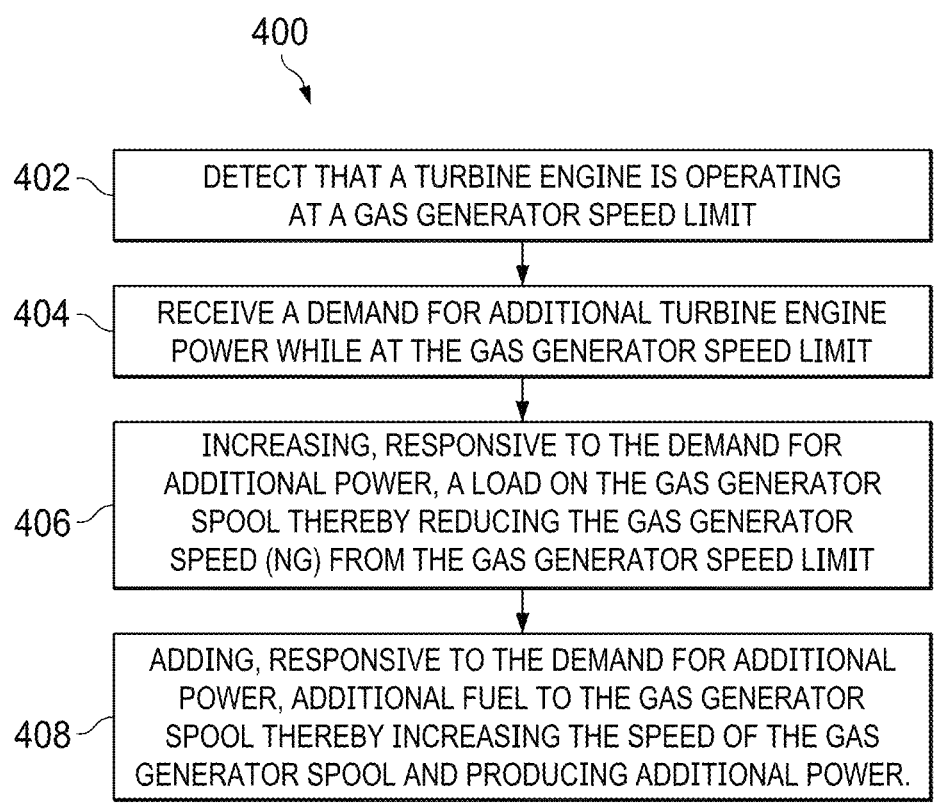
FIG. 4 is a flow chart of an exemplary gas generator speed turbine engine power recover method.

FIG. 4 is a flow chart of an exemplary gas generator speed turbine engine power recovery method 400 which is described with reference to FIGS. 1-3. At block 402, detecting that a turbine engine is operating at a gas generator speed limit. At block 404, receiving a demand for additional turbine engine power while at the gas generator speed limit. A demand for additional power when gas generator speed limited may occur for example, and without limitation, in high-altitude flight. At block 406, responsive to the power demand at block 404, increasing a load on the gas generator spool thereby reducing gas generator speed (NG) from the gas generator speed limit and increasing the speed limit margin of the turbine engine. The load on the gas generator spool may be increased in various manners. For example, and without limitation a controller may increase an electrical load on a first generator driven by the gas generator spool. The additional electrical load may be wasted or directed to energy storage or electric propulsion. The vehicle or aircraft may have a first generator driven by the gas generator spool and a second generator driven by the turbine spool and the electrical load on the second generator may be transferred to the first generator to increase the electrical load on the first generator. A controller may connect an electrical bus to the first generator to increase the electrical load. At block 408, responsive to the demand for additional power at block 404, adding additional fuel to the gas generator spool thereby increasing the speed of the gas generator spool and producing additional power.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A vehicle, comprising:
   a turbine engine having a gas generator spool and a power spool, the power spool operational to drive a rotor;
   a first generator coupled to the gas generator spool;
   a second generator coupled to the power spool;
   an electrical system, in operation, drawing a first electrical load from the first generator and a second electrical load from the second generator; and
   a controller operable, in response to an input for an increase in power demand when the turbine engine is on a gas generator speed limit and not on a temperature limit, to increase an electrical load on the gas generator spool thereby increasing a speed limit margin and power available from the turbine engine;
   wherein the controller is operable to increase the electrical load on the gas generator spool by transferring at least a portion of the second electrical load to the first generator whereby the electrical load on the gas generator spool includes the first electrical load and the at least a portion of the second electrical load.

2. The vehicle of claim 1, wherein the vehicle is a vertical take-off and landing aircraft.

3. The vehicle of claim 2, wherein the vertical take-off and landing aircraft is a helicopter.

4. The vehicle of claim 1, wherein the gas generator speed limit is a mechanical limit.

5. The vehicle of claim 1, wherein the gas generator speed limit is a corrected gas generator speed limit.

6. A turbine engine power recovery method, the method comprising:
   operating a turbine engine in an aircraft, comprising a high-speed spool, a low-speed spool, a high-speed generator coupled to the high-speed spool and providing a first electrical load to an aircraft electrical system, and a low-speed generator coupled to the low-speed spool and providing a second electrical load to the aircraft electrical system;
   boosting power of the turbine engine in response to a pilot input for additional power when the turbine engine is on a gas generator speed limit and not on a temperature limit, the boosting comprising;
   increasing a speed limit margin of the turbine engine by increasing an electrical load on the high-speed spool, wherein the increasing the electrical load comprises transferring at least a portion of the second electrical load from the second generator to the first generator; and
   adding fuel to the high-speed spool thereby increasing the turbine engine power.

7. The method of claim 6, wherein the increasing the electrical load comprises communicating electrical power from the first generator to an electrical storage.

8. The method of claim 6, wherein the second electrical load includes electrically powering an electric motor that is driving an anti-torque rotor.

9. The method of claim 6, wherein the second electrical load comprises charging an electrical storage device.

10. The method of claim 6, wherein the aircraft is a vertical take-off and landing aircraft comprising a main rotor coupled to the low-speed spool and an anti-torque fan driven by an electric motor powered by the second electrical load.

11. The method of claim 6, wherein the gas generator speed limit is a mechanical limit.

12. The method of claim 6, wherein the gas generator speed limit is a corrected gas generator speed limit.

13. A turbine engine power recovery method, comprising:
- detecting that a turbine engine is operating on a gas generator speed limit, wherein the turbine engine comprises a high-speed spool, a low-speed spool, a first generator coupled to the high-speed spool and supplying a first electrical load to an electrical system, and a second generator coupled to the low-speed spool and supplying a second electrical load to the electrical system;
- receiving a demand for additional turbine engine power while at the gas generator speed limit;
- increasing, responsive to the demand for additional power and while on the gas generator speed limit, an electrical load on the high-speed spool thereby reducing a speed of the high-speed spool from the gas generator speed limit, wherein the increasing the electrical load comprises transferring at least a portion of the second electrical load from the second generator to the first generator; and
- adding, responsive to the demand for additional power, additional fuel to the high-speed spool thereby increasing the speed of the high-speed spool and producing additional power.

14. The method of claim 13, wherein the gas generator speed limit is a mechanical limit.

15. The method of claim 13, wherein the gas generator speed limit is a corrected gas generator speed limit.

* * * * *